US012417130B2

(12) United States Patent
Subbarao et al.

(10) Patent No.: US 12,417,130 B2
(45) Date of Patent: Sep. 16, 2025

(54) EMBEDDED CAPACITY-COMPUTER MODULE FOR MICROSERVICE LOAD BALANCING AND DISTRIBUTION

(71) Applicant: SAP SE, Walldorf (DE)

(72) Inventors: Chandrashekar Kanakapura Subbarao, Bangalore (IN); Varun Gupta, Bangalore (IN)

(73) Assignee: SAP SE, Walldorf (DE)

( * ) Notice: Subject to any disclaimer, the term of this patent is extended or adjusted under 35 U.S.C. 154(b) by 550 days.

(21) Appl. No.: 17/550,147

(22) Filed: Dec. 14, 2021

(65) Prior Publication Data

US 2023/0185631 A1 Jun. 15, 2023

(51) Int. Cl.
G06F 9/46 (2006.01)
G06F 9/50 (2006.01)
G06F 9/54 (2006.01)

(52) U.S. Cl.
CPC .......... *G06F 9/5083* (2013.01); *G06F 9/5016* (2013.01); *G06F 9/544* (2013.01); *G06F 9/548* (2013.01)

(58) Field of Classification Search
CPC ...... G06F 9/5083; G06F 9/5016; G06F 9/544; G06F 9/548
See application file for complete search history.

(56) References Cited

U.S. PATENT DOCUMENTS 10,037,144 B2 * 7/2018 Rahman ................ G06F 3/0631
2016/0283274 A1 * 9/2016 Kochunni ............. G06F 9/4881

FOREIGN PATENT DOCUMENTS

CN 113821506 A * 12/2021 ....... G06F 16/24552
EP 3901773 A1 * 10/2021 ............. G06F 21/53

* cited by examiner

*Primary Examiner* — Diem K Cao
(74) *Attorney, Agent, or Firm* — Sterne, Kessler, Goldstein & Fox P.L.L.C.

(57) ABSTRACT

Disclosed herein are system, method, and computer program product embodiments for microservice load balancing and distribution using an embedded computer capacity module. An embodiment operates by retrieving an application programming interface (API) request from a client. The embodiment stores objects representing the API request in a job detail database containing details related to the API request. The embodiment determines an available bandwidth of the service instance. The embodiment transmits the determined available bandwidth of the service instance to a job processor. The embodiment selects tasks from the objects representing the API request stored in the job detail database based on the determined available bandwidth of the service instance. The embodiment executes the selected tasks.

17 Claims, 11 Drawing Sheets

EMBEDDED CAPACITY-COMPUTER MODULE FOR MICROSERVICE LOAD BALANCING AND DISTRIBUTION

BACKGROUND

With the advent of cloud-native applications, new cloud-native environments have been designed for automating mass computer application, deployment, and management. In these cloud-native environments, solutions for computer application deployment commonly involves running numerous microservices. For example, cloud-native data processing systems may run multiple instances of each microservice and application. As a result, numerous service instances must share the load of the tasks the service instances are assigned to execute.

Legacy cloud-native data processing systems often process load balancing through an external load balancer. However, these legacy systems have no knowledge of whether particular service instances are actually capable of handling a task for execution at a given time. Microservices generally have no control over external load balancers. As a result, microservices may be unable to transmit a signal to the external load balancer that the microservice instance cannot process particular tasks.

Consequently, due to the disproportionate allocation of microservice loads, service instances may be overwhelmed and fail to process assigned tasks. To properly balance and distribute microservice loads, a self-balancing microservice load balancing and distribution system is necessary to prevent overwhelming particular service instances.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for microservice load balancing and distribution through an embedded capacity-computer module. A load balancer plays an important role in distributing and balancing the load for microservices equitably in a cloud-native ecosystem. In legacy cloud-native environments, data processing systems run several instances of a microservice to process incoming API requests. These service instances need to share the load of the jobs the service instances are designed to execute. As a result, legacy load balancers distribute tasks agnostically among microservice instances without any knowledge of each microservice instance's bandwidth.

This approach is not optimal because an external load balancer may overload microservice instances with a full bandwidth while overlooking a microservice instance that may have free bandwidth to process tasks for incoming API requests. External load balancers allocating disproportionate loads amongst microservices can lead to costly and draconian job failures. Therefore, a technological solution is needed to create an ecosystem in which each microservice instance can cooperatively distribute and balance the load of incoming API requests in an equitable fashion. This technological solution would allow each microservice instance to self-regulate load distribution by computing parameters for available capacity unique to that microservice instance without an agnostic external load balancer.

Figure 1:
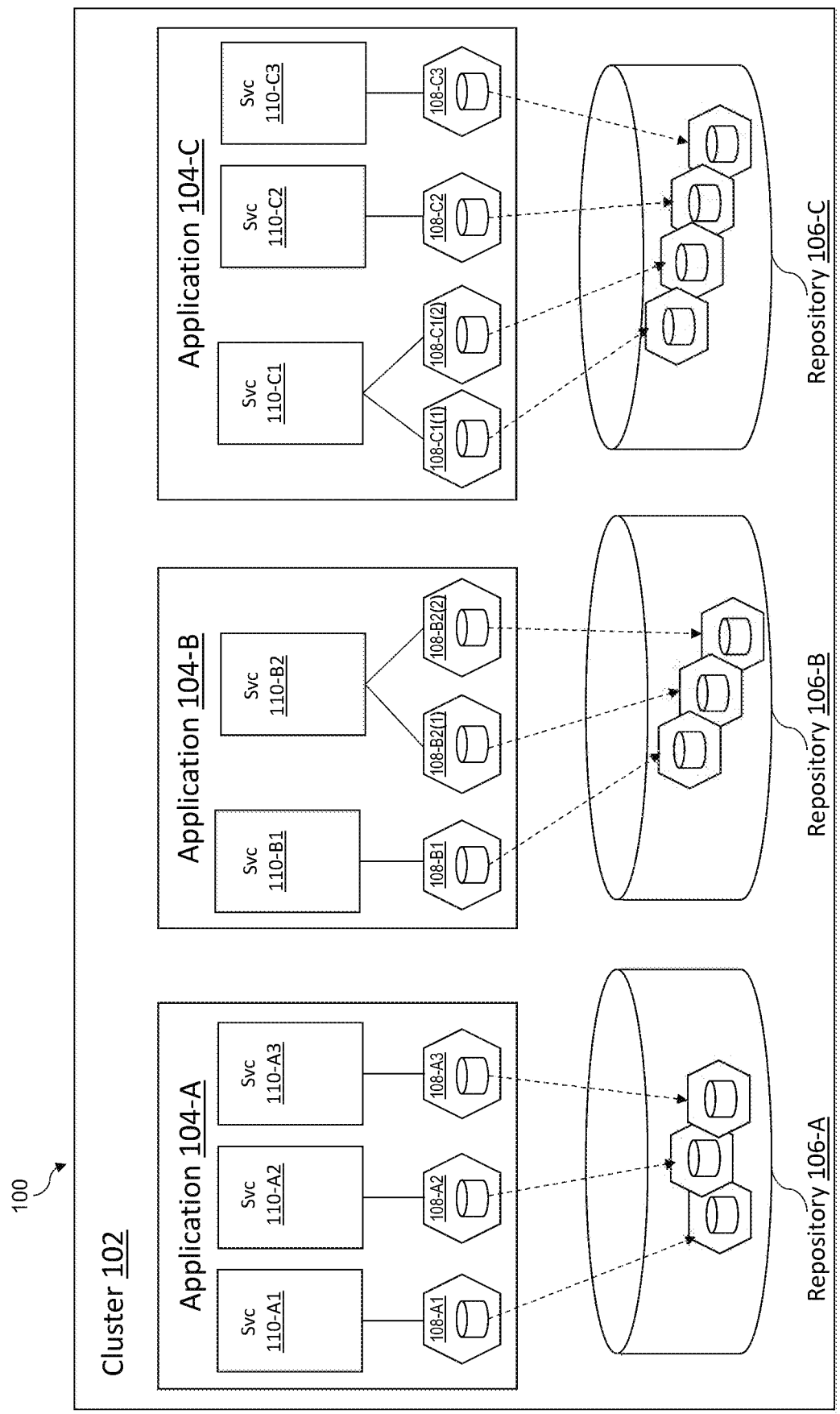
FIG. 1 is a block diagram illustrating a cloud-native data processing system, according to some embodiments.

FIG. 1 is a block diagram illustrating a cloud-native data processing system, according to some embodiments. The system 100 is an example embodiment of a cloud-native data processing system. The system 100 may contain one or more applications 104 (104-A, 104-B, 104-C, . . . , 104-X, . . . ). Each application 104 may be a distributed application comprising microservices 110 (110-A1, 110-A2, 110-A3, . . . , 110-X1 . . . ). Each microservice 110 may have several service instances 108 (108-A1, 108-A2, 108-A3, . . . , 108-X1(1), 108X1(2), . . . ). The applications 104 may be cluster managed by a cluster orchestrator. The cluster 102 may simultaneously host and run multiple applications 104. The set of applications 104 in a cluster 102 can be dynamic, in which the composition of each application 104 may change over time (e.g., due to upgrades) and the set of applications 104 themselves may also change over time.

In order to store the underlying data in a cloud orchestrator, the system 100 can use a per-application repository 106 (106-A, 106-B, 106-C, . . . 106-X, . . . ). An entire application 102 can be used as the unit while storing application data in a repository 106. The system 100 can store the data from all the service instances 108 in a single repository 106, such as an object store bucket. Data in a service instance 108 may all belong to the same application 104 and data from different applications 104 may be stored in separate repositories 106. The data may be located in separate service instances 108 each with their own access restrictions.

As discussed above, legacy load balancers do not have knowledge of the loads of specific service instances 108 in a cluster 102 and thereby may disproportionately allocate microservice loads. Therefore, service instances 108 may be overwhelmed and fail to process assigned tasks. To illustrate this technical problem and describe the features and functions of system 100, reference is made to two illustrative example microservices. This example illustrates employing a cloud-native data processing system 100 to execute several service instances 108 for two microservices 110 in a cluster 102.

In this example, cloud-native data processing system 100 contains a first microservice 110 for exporting stories (referred to as "microservice 110-A1" for illustration purposes) and a second microservice 110 for delivering messages (referred to as "microservice 110-A2" for illustration purposes). The microservice 110-A1 for exporting stories is responsible for running a headless browser, which may generate a story or report of analytics derived within a particular application 104. Microservice 110-A1 may then export the story to a pdf or pptx file. As a result, this microservice 110-A1 optimizes its resources by parallelizing multiple export jobs. For example, microservice 110-A1 may be handling up to four exports at once.

While microservice 110-A1 may parallelize multiple export jobs, microservice 110-A1 may have to parallelize export jobs for stories of different sizes. For example, a story may be a simple single page story, which microservice 110-A1 may open and export in less than ten seconds. On the other hand, microservice 110-A1 may need to open and export heavier stories, which may take more than thirty minutes for microservice 110-A1 to complete the task. This may have a direct bearing on memory and disk, as the size of the story exported may be too large.

On the other hand, microservice 110-A2 for delivering messages may be responsible for transmitting e-mails from a particular application 104 in cluster 102. Microservice 110-A2 may connect to different servers using Simple Mail Transfer Protocol and send e-mails to designated recipients. Similar to microservice 110-A1, microservice 110-A1 may need to deliver e-mails that contain attachment of varying sizes. Moreover, if there are multiple recipients of an e-mail, microservice 110-A2 may need to split the e-mail into independent e-mails to each recipient. Therefore, the number of recipients and the size of the attachments affects the load of the assigned task.

As a result, the service instances 108 in microservice 110-A and microservice 110-B cannot complete the tasks within comparable times and/or with comparable resources. The service instances 108 will need a mechanism to reject certain jobs assigned for execution until the service instances 108 have freed up the bandwidth to execute further tasks. However, legacy external load balancers only forward API requests and are not aware of the internal load situation of the service instances 108 for microservice 110-A and microservice 110-B. Thereby, legacy external load balancers simply forward the request based on its own implemented algorithm, such as round robin.

Figure 2A:
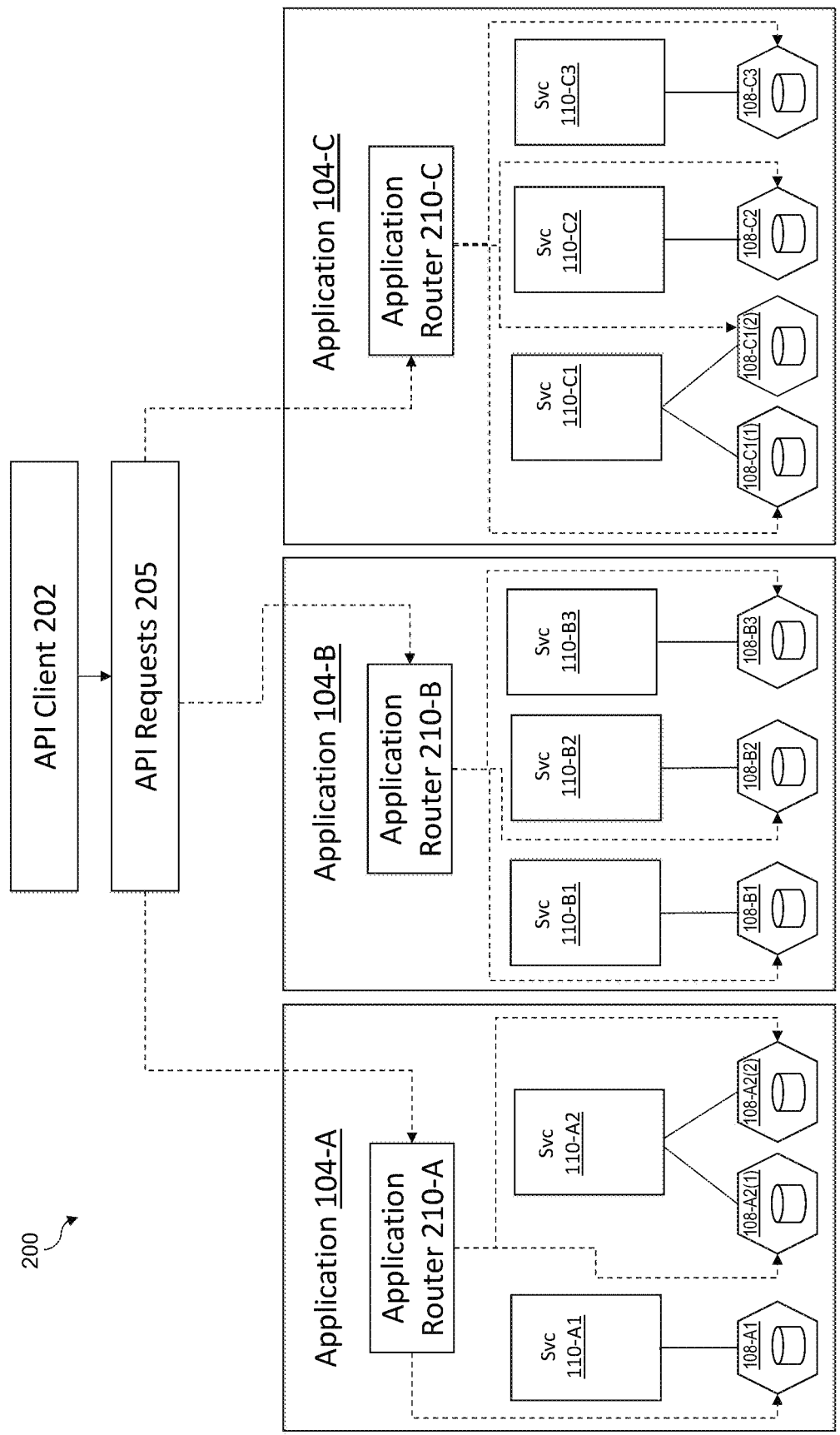
FIG. 2A is a block diagram illustrating an example of cloud routing within a cloud-native data processing system, according to some embodiments.

FIG. 2A is a block diagram illustrating an example of cloud routing within a cloud-native data processing system, according to some embodiments. FIG. 2 is described with reference to FIG. 1. Cloud-native data processing system 100 may retrieve API requests 205 from one or more API clients 202. To process API request 205, cloud-native data processing system 100 may use an application router 210 to route any incoming API request 205 to the relevant service instances 108. Legacy cloud-native data processing systems generally use a central application router 210 for an entire application 104 to route API request 205 to the relevant service instances 108.

As a result, application router 210 may be an infrastructure service for cloud-native data processing system 100 that cannot be controlled and/or customized for individual service instances 108 used to process API request 205. Application router 210 may use routing techniques known to a person of ordinary skill in the art to route API request 205 to the relevant service instances 108. In legacy cloud-native data processing systems, application router 210 uniformly routes API request 205 to the relevant microservices 110 and service instances 108. For example, application router 210 may use a technique such as round robin to the load of API request 205 among the relevant service instances 108. By using the round robin technique to route API request 205, application router 210 is entirely agnostic to the current bandwidth of the service instances 108.

Therefore, because application router 210 may be a centralized router for an entire application 104, a service developer that is developing only the service 110 and/or the service instances 108 may not have any control over the load balancing or distribution of API request 205 to particular services 110 or service instances 108. However, oftentimes services 110 and service instances 108 may need special or unique load distribution capabilities. To address this problem, cloud-native data processing system 100 may use additional service load balancer 215 for each particular service type, as described in FIG. 2B. A service load balancer 215 would need to determine the particular service instances 108 that can be assigned a task for API request 205 based on some availability metrics that the service instances 108 may transmit to the service load balancer 215.

For purposes of illustration, service instances 108 (108-A1, 108-A2, and 108-A3) are instances of microservice 110-A1 for exporting stories, as described above. In this implementation, service load balancer 215 may distribute load only amongst service instances 108 of microservice 110-A1 for exporting stories. While this may be technically feasible, service developers will need to write two separate microservices 110: one microservice for the actual service for exporting stories and one microservice for the service load balancer 215. As a result, enterprises will need to expend significant overhead to separately maintain the life cycle of service load balancer 215. As a result, cloud-native data processing systems will need to free up additional disk space for the service load balancer 215. Otherwise, enterprises may face catastrophic consequences in the case service load balancer 215 fails or becomes unavailable. Therefore, cloud-native data processing system 100 will need to run multiple instances of service load balancer 215.

Figure 2B:
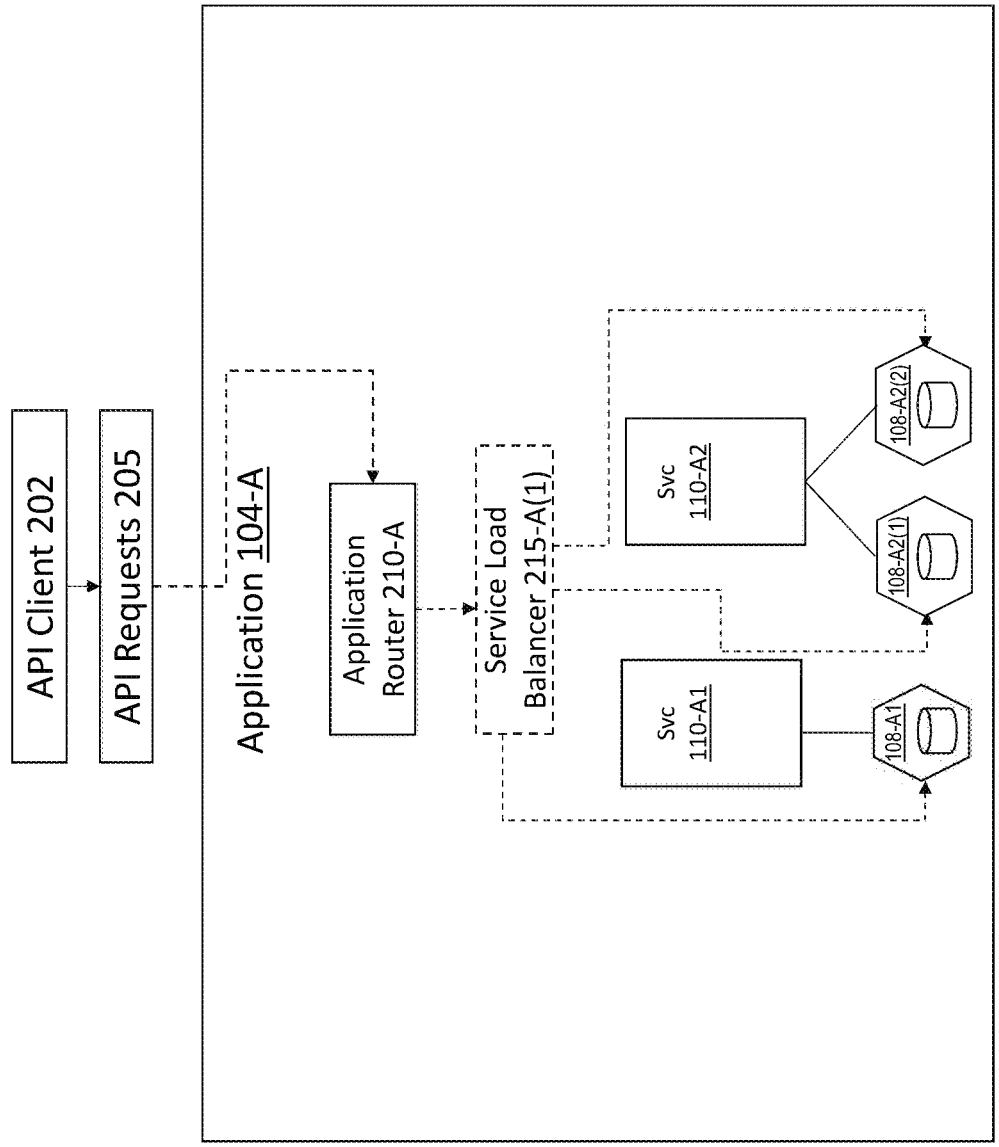
FIG. 2B is a block diagram illustrating an example of cloud routing within a cloud-native data processing system using an external service load balancer, according to some embodiments.
Figure 2C:
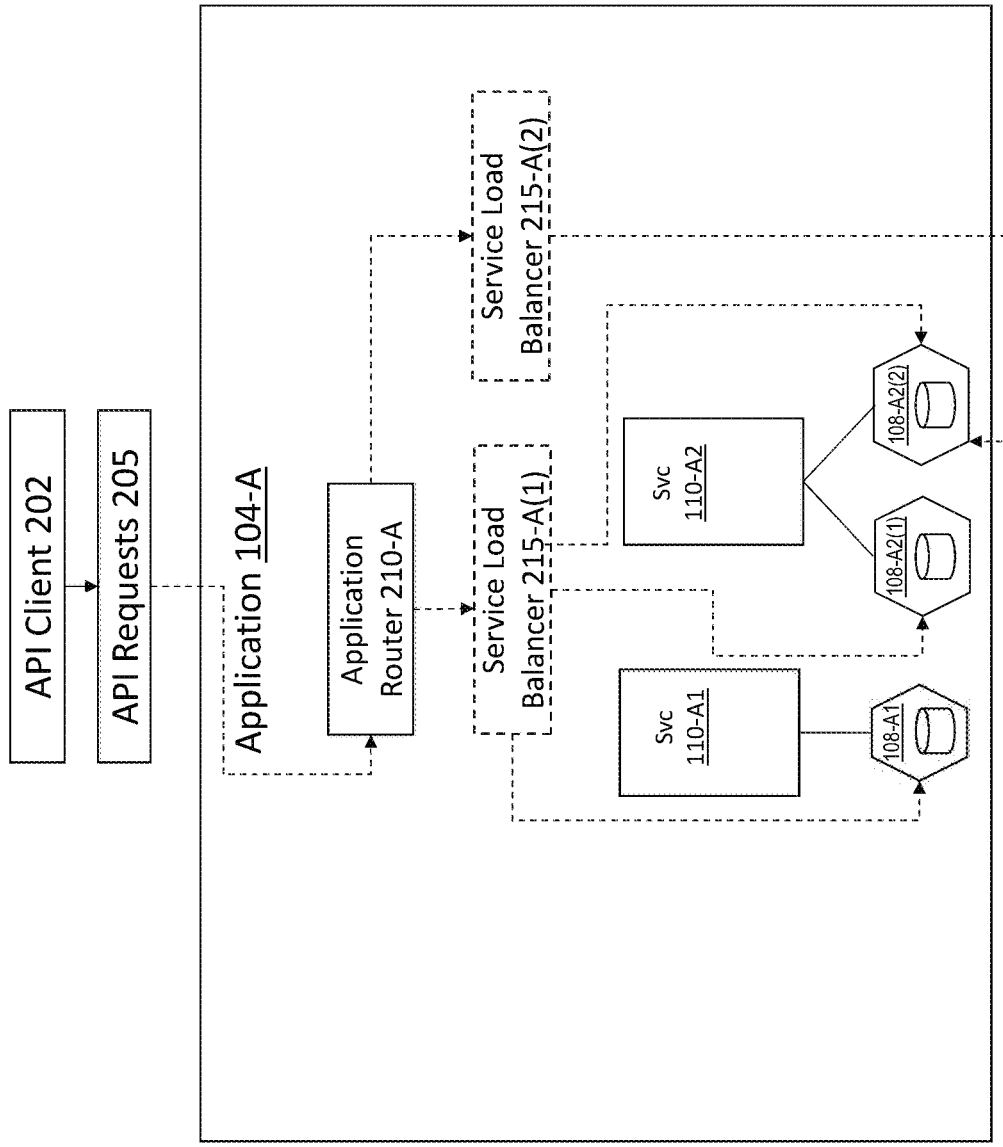
FIG. 2C is a block diagram illustrating an example of cloud routing within a cloud-native data processing system using an external service load balancer for each microservice, according to some embodiments.

Even with the implementation in FIG. 2B, the solution for microservice load balancing and distribution is still incomplete. For example, as shown in FIG. 2C, service load balancer 215-A1 and service load balancer 215-A1 may both simultaneously detect that service instance 108-A1 has spare bandwidth. Both service load balancer 215-A1 and service load balancer 215-A2 may accordingly assign separate tasks to service instance 108-A1. This may cause issues because the separate tasks service load balancer 215-A1 and service load balancer 215-A2 assigned may exceed the spare bandwidth of service instance 108-A1. Therefore, the service load balancers 215 would need further implementation to lock particular service instances 108 and assign a task.

Considering the significant overhead costs for further implementation (as illustrated in FIGS. 2A and 2B) and existing architectural models for load balancing and distribution, legacy cloud-native data processing systems generally use load balancers external to the microservice 110 and service instances 108 implementations. Therefore, a solution is needed to optimize microservice load balancing and distribution by enabling service instances 108 to intelligently determine which tasks the service instances 108 would need to process for API request 205 without an external load balancer.

Figure 3:
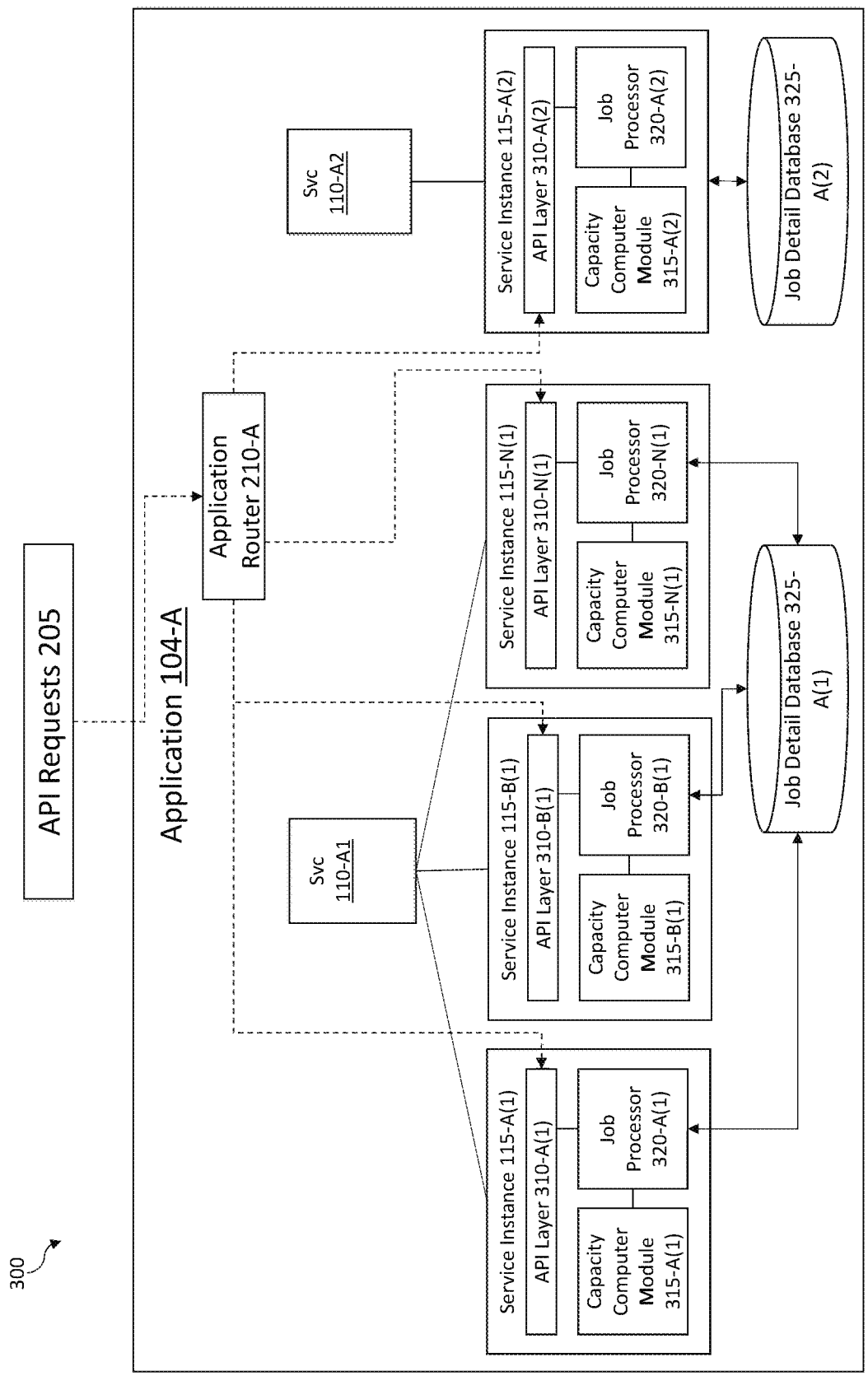
FIG. 3 is a block diagram illustrating an example of an embedded capacity-computer module for microservice load balancing and distribution, according to some embodiments.

FIG. 3 is a block diagram illustrates an example of an embedded capacity-computer module for microservice load balancing and distribution, according to some embodiments. FIG. 3 is described with reference to FIG. 1 and FIG. 2. As discussed above, a solution is needed to distribute and balance loads for each service instance 108 without an external load balancer. An embedded capacity-computer module for each service instance 108 enables load balancing and distribution without the consequences and overhead costs of an external load balancer. Each microservice 110 for applications 104 may include a job detail database 325. Each service instance 108 for application 104 may include, but is not limited to, API layer 310, capacity computer module 315, and job processor 320.

In order to distribute and balance the load of service instances 108, system 100 may not immediately process a job when a service instance is assigned an API request 205. Instead, system 100 defers the job processing until a service instance 108 can process API request 205. To defer API request 205, service instance 108 transmits an incoming API request 205 into job detail database 325 as an object. Job detail database 325 may be a data structure that stores API requests 205 in a job queue. Job detail database 325 may contain job details for each incoming API request 205 including, but not limited to, the time of arrival of API request 205, the time of insertion of the object representing API request 205 in job detail database 325, and other relevant information to the API request 205. Each incoming API request 205 may be stored into a common queue in job detail database 325.

Job detail database 325 may be a data store. Job detail database 325 may be a relational database, a NoSQL database or other horizontally scaling database, or any other database adhering to a suitable database design methodology. In an embodiment, the data store may implement a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, the data store may deploy a hard-disk interface, such as ATA, SATA, SCSI, SAS, and/or fibre for interfacing with storage mediums.

Each service instance 108 may have an internal, embedded capacity computer module 315. The capacity computer module 315 for each service instance 108 may continuously monitor the capacity and/or available bandwidth for the service instance 108 embedding its respective capacity computer module 315. Capacity computer module 315 may continuously, or at frequent intervals, monitor and/or compute the available bandwidth of its respective instance 108. Capacity computer module 315 may consider various parameters and metrics to compute capacity and/or available bandwidth for each service instance 108 including, but not limited to, available memory, available disk space, the amount of memory required to process certain API requests 205, etc. Capacity computer module 315 may communicate to job processor 320 the capacity and/or available bandwidth service instance 108 has for a designated number of jobs.

Each service instance 108 may have a job processor 320. Job processor 320 selects API requests 205 from job detail database 325 to process up to the designated number of jobs capacity computer module 315 communicated to job processor 320. Service instances 108 may then lock the objects of the API requests 325 in job detail database 325 after job processor 320 selected the API requests 205 to process from job detail database 325. As a result, no more than one service instance 108 may select and/or process the same API request 205 stored in job detail database 325. Service instances 108 may use any algorithm known to a person of ordinary skill in the art to lock API requests 205 in job detail database 325.

In some embodiments, microservices 110 may have templates for service development. These templates may define standards for service development using interface definitions. For example, microservice 110 may include a functionality to include an interface for computing the capacity of each service instance 108 (i.e., computeCapacity(){ }). In some embodiments, the microservice 110 itself may designate itself as a self-balancing service. Self-balancing microservices 110 may override an interface method (e.g., computeCapacity( ){ }) according to the needs of that microservice 110.

To describe the solution architecture and functions of system 300, reference is made to the illustrative example microservices for exporting stories, as described above in FIGS. 1-2. System 100 may receive several API requests 205 from API client 202 to export stories. System 100 may route API requests 205 to the application router 210 for the relevant application 104, and in this instance, application router 210-A for application 104-A. Application 210-A may then route the particular tasks of API requests 205 to the relevant service instance 108. In this case, application router 210-A routes API requests 205 to API layer 310-A of service instance 108-A(1) for exporting stories. Before processing API requests 205, service instance 108-A(1) transmits API requests 205 and job detail database 325-A stores objects of the incoming API requests 205.

Capacity computer module 315-A(1) then computes capacity and/or available bandwidth for service instance 108-A(1). The algorithm may include various parameters and metrics to determine whether service instance 108-A(1) has capacity and/or available bandwidth for processing API requests 205 to export stories. In this case, capacity computer module 315-A(1) may consider the following metrics. First, capacity computer computer module 315-A(1) may consider available memory. Memory may be considered to be a crucial factor in an entire workflow for starting up an instance of a headless browser, loading a story, and then exporting the story to a PDF file. As a secondary consideration, capacity computer module 215-A(1) may consider available disk space, which may become relevant if the generated artifacts are saved on a disk.

Finally, capacity computer module 315-A(l) may consider metrics that determine the nature of the story included in API requests 205-A. For example, capacity computer module 315-A may consider how much memory is required to load and export stories to PDF or PPTx files. These metrics may be a classifier metrics that classifies a story as a small, medium, or large files. Depending on the amount of memory available at that time, capacity computer module 315-A(1) may use the resulting computation to inform its determination of how many tasks job processor 320 can process. These metrics are only highlighted for purposes of illustration. However, a person of ordinary skill in the art may consider any relevant parameters, metrics, and/or algorithms a capacity computer module 315 may incorporate into its computation to determine the capacity and/or available bandwidth for service instances 108.

As discussed above, microservice 110-A1 for exporting stories is responsible for running a headless browser, which may generate a story or report of analytics derived within a particular application 104. Microservice 110-A1 may then export the story to a pdf or pptx file. As a result, this microservice 110-A1 optimizes its resources by parallelizing multiple export jobs. Microservice 110-A1 may run several headless browser. The number of browser instances that can run may determine on the concurrency of export jobs service instance 108 can handle. For example, microservice 110-A1 may only be able to handle up to four exports at once.

After capacity computer module 315-A(1) determines the capacity and/or available bandwidth for service instance 108-A(l) to process particular jobs for exporting stories stored in job detail database 325-A, capacity computer module 315-A(l) communicates the designated number of tasks from API requests 205 job processor 320 can process. Therefore, job processor 320 may select a job from job detail database 325-A for running a headless browser, generating a story of analytics, exporting the story to a pdf or pptx file, etc. However, job processor 320 may only select these jobs up to the designated number of tasks from API requests 205 job processor 320 may process. After job processor 320 selects jobs to process from job detail database 325-A, service instance 108-A(l) may lock these jobs in job detail database 325-A. As a result, only service instance 108-A(l) may select and process the relevant jobs to process API requests 205. Job processor 320 may then process the jobs for exporting stories selected from job detail database 325-A.

As a result, an embedded computer capacity module 315 enables service instances 108 to determine its own capacity and available/bandwidth without the costs and consequences of an external load balancer. As discussed previously, legacy load balancers could not communicate with specific service instances to determine capacity and/or available bandwidth. By embedding computer capacity module 325 for each service instance 108, the service instances 108 in each application 104 cooperate as good citizens to distribute and balance the load of API requests 205 by self-regulating its available capacity. Each service instance 108 may continuously, or at frequent intervals, monitors and computes its capacity and/or available bandwidth, which prevents specific service instances 108 from being idle or other service instances 108 from being overloaded. As each service instance 108 for applications 104 are proactive and involved citizens, the entire load of API requests 205 is well distributed, managed, and balanced among the service instances 108.

FIG. 4 is an example embodiment of job detail database 325, according to some embodiments. FIG. 4 is described with reference to FIGS. 1-3. As discussed above, job detail database 325 may be a data structure that stores API requests 205 in a job queue. Job detail database 325 may contain job details for each incoming API request 205 and other relevant information to the API request 205. To describe the job detail database 325, reference is made to the illustrative example microservices for exporting stories, as described above in FIGS. 1-3.

Figure 4A:
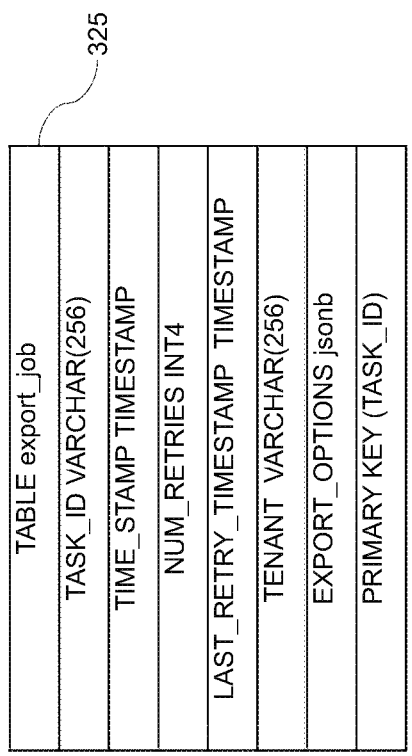
FIGS. 4A-4D are an example of a job detail database, according to some embodiments.

Referring to FIG. 4A, as discussed in FIG. 3, before processing API requests 205, microservice 110-A(1) transmits API requests 205 and job detail database 325-A stores objects of the incoming API requests 205. The API requests 205 may be stored in a table structure as illustrated in FIG. 4A. In this example embodiment, "TABLE export_job" is a table that stores job details for an incoming API request 205, such as the timestamp the job detail database received the API request 205.

The job details may also include variables, such as, "TASK_ID VARCHAR(256)," which is an ID generated for the particular API request 205, and "TIME STAMP TIMESTAMP," which may represent the timestamp that the API request was inserted and entered into the queue. Job details may also include variables such as "NUM_RETRIES INT4," which represents a counter of how many times an API request 205 failed to be processed because an API request 205 may remain in a table or queue until the request is completed successfully or enters into a failed state.

As this is a multi-tenant solution in a cloud environment, job detail database 325 may also include details or variables related to the tenants, such as, "TENANT VARVHAR (256)," which is a unique identifier that represents which tenant an API request 205 belongs to.

Finally, in this example embodiment, job detail database may also include objects representing the details of API request 205, such as, "EXPORT_OPTIONS jsonb," which represents the details of the API request 205 itself. This may include details similar to the payload. For example, using the microservices example for exporting stories, microservice 110 may receive the following API request 205, as follows:

```
{
    "id": "{{id}}",
    "tenant": "{{tenant}}",
    "tenantName": "{{tenantName}}",
    "format": "PDF", //the exported artifact can either be PDF or PPT
    "url": "{{url}}", //The story URL which has to be exported.
    "bookmarks": [ //The story can have multiple bookmarks which are chosen to
//exporting. Bookmarks is set of filters.
        {
            "bookmarkId": "STORY",
            "internalId": "{{Sguid}}",
            "includeAppendix": true,
            "pages": [ ],
            "pageLayout": {
                "rows": "ALL",
                "columns": "ALL"
            } // Some details for the actual exporting.
        }
    ]
}
```

This payload may then be stored as "EXPORT_OPTIONS jsonb" in job detail database 325, as illustrated in FIG. 4A.

Figure 4B:
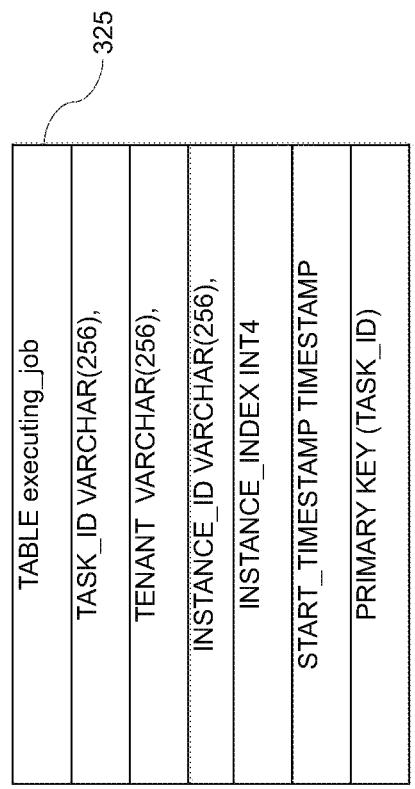

Referring to FIG. 4B, job detail database 325 may also include a table structure that tracks executing API requests 205. In this example embodiment, "TABLE executing_job" is a table that keeps records of executing API requests 205. Once a microservice 110 is assigned an API request 205 and processes the API request 205, an entry is inserted into this table. This table may include identification variables for tasks and tenants, as described in FIG. 4A, such as, "TASK_ID VARCHAR(256)" and "TENANT_VARCHAR (256)." Additionally, to track the executing jobs, this table may store identification variables, such as, "INSTANCE_ID VARCHAR(256)," which is an ID for the microservice 110 executing the API request 205, and "INSTANCE_INDEX INT4," which is an index of microservice 110.

Once an API request 205 is assigned to a microservice 110, it may take some time before the actual API request 205 is executed. For this reason, it may be valuable to incorporate metrics related to the time it takes to execute API requests 205. Accordingly, this table may include variables and metrics to track executing API requests 205, such as, "START_TIMESTAMP TIMESTAMP," which captures a specific time when an export job starts for the microservice 110-A(1) for exporting stories.

Figure 4C:
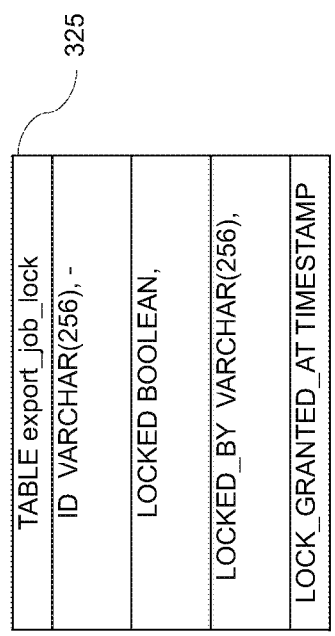
Figure 4D:
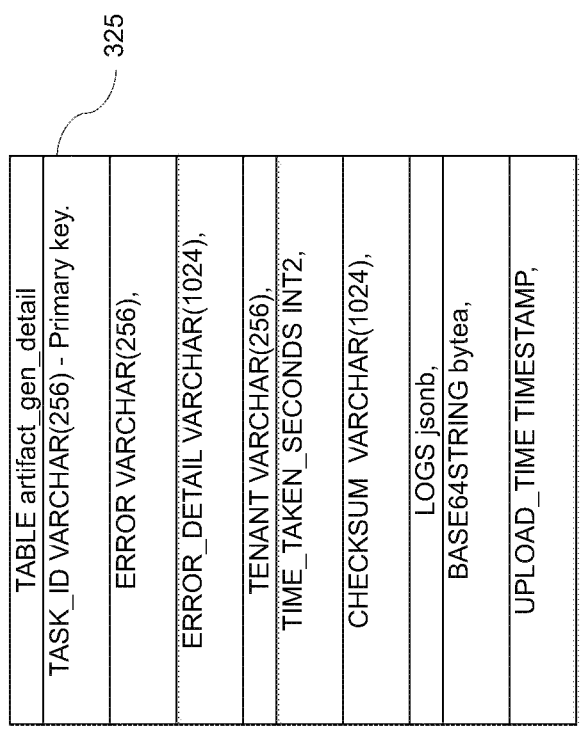

As discussed above, after job processor 320 selects jobs to process from job detail database 325-A, microservice 110-A(1) may lock these jobs in job detail database 325-A. Referring to FIG. 4C, job detail database 325-A may include a table structure for locking the job detail-database. In this example embodiment, "TABLE export_job_lock" is a table that locks job detail database 325 to ensure the same API request 205 does not get picked up by multiple microservices 110. Accordingly, microservice 110 may acquire a lock and select jobs from the "export_job" table illustrated in FIG. 4A.

This table may include boolean variables, such as, "LOCKED BOOLEAN," which indicates whether a particular API request 205 is locked. A value of true would indicate that API request 205 is locked and a value of false would indicate that API request 205 is currently unlocked. The table may also track the microservice 110 an API request 205 was assigned to by storing variables, such as, "LOCKED_BY VARCHAR (256)," which is an identification variable for the microservice 110 that locked a particular API request 205. This table may also include variables and metrics relevant to tracking locked API requests 205, such as, "LOCK_GRANTED_AT TIMESTAMP," which is a variable that represents the time at which a particular API request 205 was locked.

Job detail database 325 may also include a table structure that stores runtime details for API requests 205. In this example embodiment, "TABLE artifact gen detail" is a table that contains runtime details about microservice 110-A(1) for exporting stories for a particular API request 205 when and after microservice 110-A(1) has exported a story. The table may include details about the task by storing identification variables and the tenant such as "TASK_ID VARCHAR(256)" and "TENANT VARCHAR(256)."

The table may include variables representing any errors at runtime, such as, "ERROR VARCHAR(256)," which is a variable that represents whether an error occurred when microservice 110-A(1) exported any stories, and "ERROR DETAIL VARCHAR(1024)," which may represent full error details.

The table may include variables unique to microservice 110-A(1) for exporting stories. For example, the table may include a variable, such as, "CHECKSUM VARCHAR (1024)," which can check whether there was any corruption in a story when an artifact was uploaded or sent as an e-mail, "LOGS jsonb," which can generate important logs for stories that were exported as part of API request 205, "BASE64STRING bytea," which is the final story to be sent to recipients, and "UPLOAD_TIME TIMESTAMP," which is a variable that represents the time of uploading a story for further delivery.

Accordingly, according to this example embodiment, job detail database 325 can store job details related to an API request 205, track executing API requests 205, lock API requests 205, and store runtime details related to API requests 205. This example is only provided for illustrative purposes. Job detail database 325 may store any information in any format known to a person of ordinary skill in the art for microservice load balancing and distribution.

Figure 5:
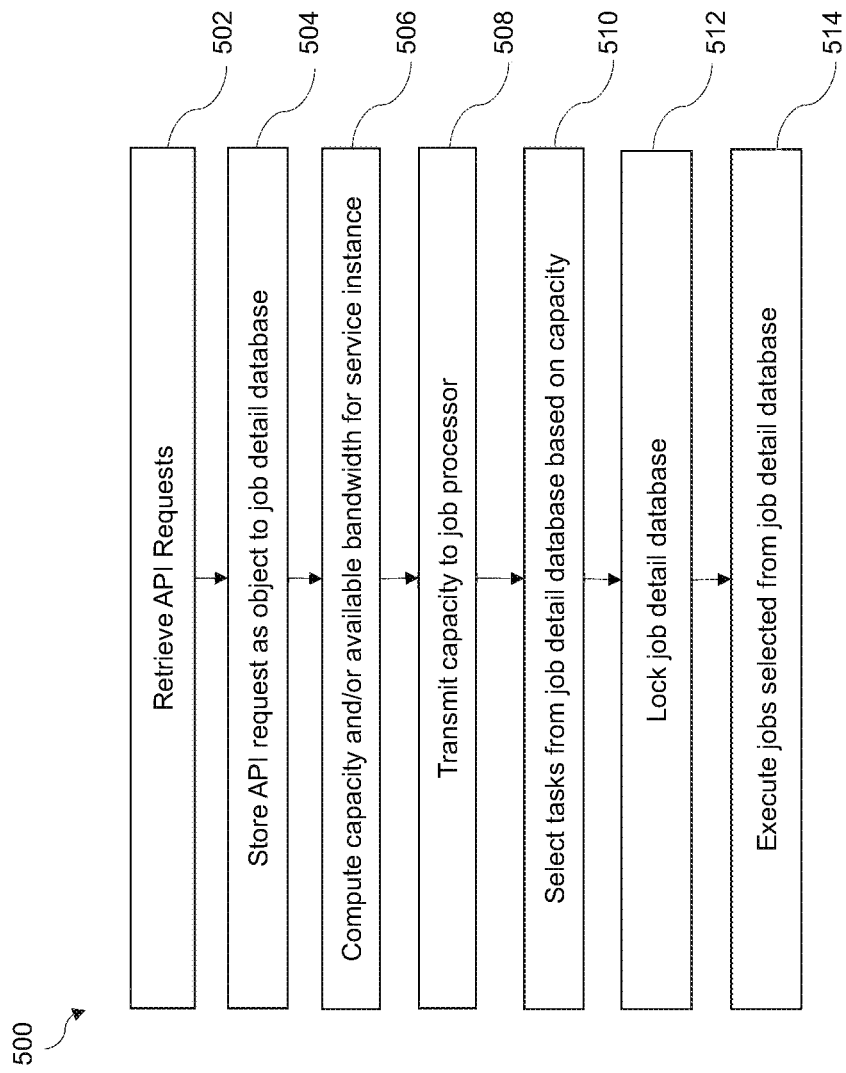
FIG. 5 is a flowchart illustrating a method for microservice load balancing and distribution through an embedded capacity-computer module, according to some embodiments.
Figure 6:
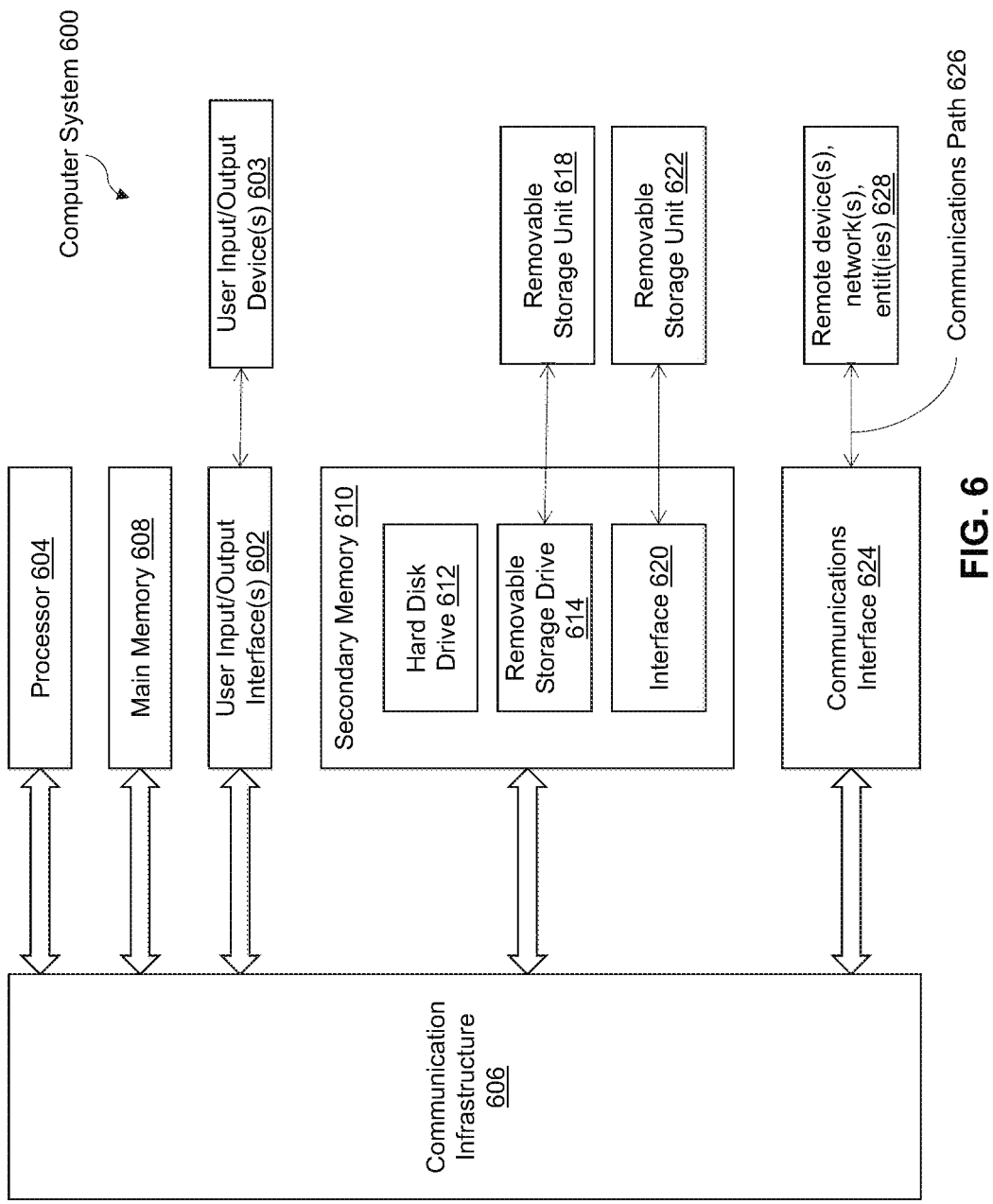
FIG. 6 is an example computer system useful for implementing various embodiments.

FIG. 5 is a flowchart illustrating a method for microservice load balancing and distribution using an embedded computer capacity module, according to some embodiments. FIG. 5 is described with reference to FIGS. 1-4. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

At 502, service instances 108 retrieves API requests 205. System 100 receives API requests 205 from API client 202. System 100 routes API requests 205 to the application router 210 for the relevant application 104. Application 210-A then routes the particular tasks of API requests 205 to the API layer 310 of the relevant service instance 108. Application router 210 determines the relevant service instance 108 based on the nature of the API requests 205.

At 504, service instances 108 stores API requests 205 as objects in job detail database 325. In order to distribute and balance the load of service instances 108, system 100 does not immediately process a job when a service instance is assigned an API request 205. Instead, system 100 defers the job processing until a service instance 108 can process API request 205. To defer API request 205, service instance 108 stores an incoming API request 205 into job detail database 325 as an object. Job detail database 325 may be a data structure that stores API requests 205 in a job queue. Job detail database 325 may contain job details for each incoming API request 205 including, but not limited to, the time of arrival of API request 205, the time of insertion of the object representing API request 205 in job detail database 325, and other relevant information to the API request 205. Each incoming API request 205 is stored into a common queue in job detail database 325.

At 506, service instances 108 computes capacity and/or available bandwidth for service instances 108. Each service instance 108 may have an internal, embedded capacity computer module 315. The capacity computer module 315 for each service instance 108 may continuously monitor the capacity and/or available bandwidth for the service instance 108 embedding its respective capacity computer module 315. Capacity computer module 315 may continuously, or at frequent intervals, monitor and/or compute the available bandwidth of its respective instance 108. Capacity computer module 315 may consider various parameters and metrics to compute capacity and/or available bandwidth for each service instance 108 including, but not limited to, available memory, available disk space, the amount of memory required to process certain API requests 205, etc.

At 508, service instances 108 transmits the capacity and/or available bandwidth for service instances 108. Capacity computer module 315 may communicate to job processor 320 the capacity and/or available bandwidth service instance 108 has for a designated number of jobs.

At 510, service instances 108 selects tasks from job detail database based on the capacity and/or available bandwidth for service instances 108. Each service instance 108 may have a job processor 320. Job processor 320 selects API requests 205 from job detail database 325 to process up to the designated number of jobs capacity computer module 315 communicated to job processor 320. In some embodiments, microservices 110 may have templates for service development. These templates may define standards for service development using interface definitions. For example, microservice 110 may include a functionality to include an interface for computing the capacity of each service instance 108 (i.e., computeCapacity( ){ }). In some embodiments, the microservice 110 itself may designate itself as a self-balancing service. Self-balancing microservices 110 may override an interface method (e.g., computeCapacity( ){ }) according to the needs of that microservice 110.

At 512, service instances 108 locks job detail database 325. Service instances 108 may then lock the objects of the API requests 325 in job detail database 325 after job processor 320 selected the API requests 205 to process from job detail database 325. As a result, no more than one service instance 108 may select and/or process the same API request 205 stored in job detail database 325. Service instances 108 may use any algorithm known to a person of ordinary skill in the art to lock API requests 205 in job detail database 325.

At 514, service instances 108 executes the jobs selected from job detail database 325. Service instances 108 may execute jobs selected from job detail database 325 for API requests 205 retrieved by a different service instance 108.

Various embodiments can be implemented, for example, using one or more computer systems, such as computer system 600 shown in FIG. 5. FIG. 5 is described with reference to FIGS. 1-5. Computer system 600 can be used, for example, to implement method 500 of FIG. 5. For example, computer system 600 can implement and execute a set of instructions comprising retrieving API requests 205, transmitting API requests 205 to job detail database 325, computing the capacity and/or available bandwidth for service instances 108, transmitting the capacity and/or available bandwidth of service instances 108 to job processor 320, selecting tasks from job detail database 325, locking job detail database 325, and/or executing jobs selected from job detail database 325. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    retrieving, via a first service instance, an application programming interface (API) request from a client;
    storing, via the first service instance, an object representing the API request in a job detail database containing details related to the API request;
    determining, by a capacity computer module of the first service instance, an available bandwidth of the first service instance;
    transmitting, via the first service instance, the available bandwidth of the first service instance to a job processor;
    selecting, via the first service instance, a task associated with the object representing the API request stored in the job detail database based on the available bandwidth of the first service instance;
    in response to the selecting, locking, via the first service instance, the object stored in the job detail database, the locking preventing a selection of the object by a second service instance that is different from the first service instance;
    executing, via the first service instance, the selected task; and
    executing, via the second service instance, a second task associated with a second object representing a second API request stored in the job detail database, wherein the second service instance is different from the first service instance that received the API request;
    wherein at least one of the retrieving, storing, determining, transmitting, and selecting are performed by one or more computers.

2. The method of claim 1, wherein the executing the selected task comprises:
    executing, via the first service instance, the task based on templates that define standards for processing the task using interface definitions.

3. The method of claim 1, wherein the determining, by the capacity computer module of the first service instance, the available bandwidth of the first service instance comprises:
    determining, by the capacity computer module of the first service instance, the available bandwidth of the first service instance based on parameters including available memory.

4. The method of claim 1, wherein the determining, by the capacity computer module of the first service instance, the available bandwidth of the first service instance comprises:
    determining, by the capacity computer module of the first service instance, the available bandwidth of the first service instance based on parameters including available disk space.

5. The method of claim 1, wherein the determining, by the capacity computer module of the first service instance, the available bandwidth of the first service instance comprises:
    determining, by the capacity computer module of the first service instance, the available bandwidth of the first service instance based on parameters including an amount of memory required to process the API request.

6. The method of claim 1, further comprising wherein the determining, by the capacity computer module of the first service instance, the available bandwidth of the first service instance comprises:
    determining, by the capacity computer module of the first service instance, the available bandwidth of the first service instance at intervals.

7. A system, comprising:
    a memory; and
    at least one processor coupled to the memory and configured to:
    retrieve, via a first service instance, an application programming interface (API) request from a client;
    store, via the first service instance, an object representing the API request in a job detail database containing details related to the API request;
    determine, by a capacity computer module of the first service instance, an available bandwidth of the first service instance;
    transmit, via the first service instance, the available bandwidth of the first service instance to a job processor;
    select, via the first service instance, a task associated with the object representing the API request stored in the job detail database based on the available bandwidth of the first service instance;
    in response to the selecting, lock, via the first service instance, the object stored in the job detail database, the locking preventing a selection of the object by a second service instance that is different from the first service instance;
    execute, via the first service instance, the selected task; and
    execute, via the second service instance, a second task associated with a second object representing a second API request stored in the job detail database, wherein the second service instance is different from the first service instance that received the API request.

8. The system of claim 7, wherein the at least one processor is further configured to:
    execute, via the first service instance, the task based on templates that define standards for processing the task using interface definitions.

9. The system of claim 7, wherein the at least one processor is further configured to:
   determine, by the capacity computer module of the first service instance, the available bandwidth of the first service instance based on parameters including available memory.

10. The system of claim 7, wherein the at least one processor is further configured to:
    determine, by the capacity computer module of the first service instance, the available bandwidth of the first service instance based on parameters including available disk space.

11. The system of claim 7, wherein the at least one processor is further configured to:
    determine, by the capacity computer module of the first service instance, the available bandwidth of the first service instance based on parameters including an amount of memory required to process the API request.

12. The system of claim 7, wherein the at least one processor is further configured to:
    determine, by the capacity computer module of the first service instance, the available bandwidth of the first service instance at intervals.

13. A non-transitory computer-readable medium having instructions stored thereon that, when executed by at least one computing device, cause the at least one computing device to perform operations comprising:
    retrieving, via a first service instance, an application programming interface (API) request from a client;
    storing, via the first service instance, an object representing the API request in a job detail database containing details related to the API request;
    determining, by a capacity computer module of the first service instance, an available bandwidth of the first service instance;
    transmitting, via the first service instance, the available bandwidth of the first service instance to a job processor;
    selecting, via the first service instance, a task associated with the object representing the API request stored in the job detail database based on the available bandwidth of the first service instance;
    in response to the selecting, locking, via the first service instance, the object stored in the job detail database, the locking preventing a selection of the object by a second service instance that is different from the first service instance;
    executing, via the first service instance, the selected task; and
    executing, via the second service instance, a second task associated with a second object representing a second API request stored in the job detail database, wherein the second service instance is different from the first service instance that received the API request.

14. The non-transitory computer-readable medium of claim 13, wherein the executing the selected task comprises:
    executing, via the first service instance, the task based on templates that define standards for processing the task using interface definitions.

15. The non-transitory computer-readable medium of claim 13, wherein the determining, by the capacity computer module of the first service instance, the available bandwidth comprises:
    determining, by the capacity computer module of the first service instance, the available bandwidth of the first service instance based on parameters including available memory.

16. The non-transitory computer-readable medium of claim 13, wherein the determining, by the capacity computer module of the first service instance, the available bandwidth comprises:
    determining, by the capacity computer module of the first service instance, the available bandwidth of the first service instance based on parameters including available disk space.

17. The non-transitory computer-readable medium of claim 13, wherein the determining, by the capacity computer module of the first service instance, the available bandwidth comprises:
    determining, by the capacity computer module of the first service instance, the available bandwidth of the first service instance based on parameters including an amount of memory required to process the API request.

* * * * *